United States Patent
Poupyrev (10) Patent No.: US 11,079,289 B2
(45) Date of Patent: Aug. 3, 2021

(54) RADAR-BASED FORCE SENSING

(71) Applicant: Google LLC, Mountain View, CA (US)

(72) Inventor: Ivan Poupyrev, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 227 days.

(21) Appl. No.: 15/681,120

(22) Filed: Aug. 18, 2017

(65) Prior Publication Data

US 2019/0056276 A1    Feb. 21, 2019

(51) Int. Cl.
  *G01L 1/04* (2006.01)
  *G01S 13/88* (2006.01)

(52) U.S. Cl.
  CPC .............. *G01L 1/04* (2013.01); *G01S 13/88* (2013.01)

(58) Field of Classification Search
  CPC ..... G01L 1/04; G06F 3/0414; G06F 3/04144; G01S 13/88
  USPC ......................................................... 342/28
  See application file for complete search history.

(56) References Cited

U.S. PATENT DOCUMENTS

| | | | |
|---|---|---|---|
| 8,682,395 | B2 | 3/2014 | Muhammad |
| 9,122,330 | B2 | 9/2015 | Bau et al. |
| 9,569,003 | B2 | 2/2017 | Rofougaran et al. |
| 2006/0025897 | A1 | 2/2006 | Shostak et al. |
| 2007/0051591 | A1* | 3/2007 | Otsuka ................ H01H 13/84 200/5 A |
| 2013/0241823 | A1 | 9/2013 | Pryor |
| 2016/0041618 | A1 | 2/2016 | Poupyrev |
| 2016/0378255 | A1 | 12/2016 | Butler et al. |
| 2017/0052618 | A1 | 2/2017 | Lee et al. |

FOREIGN PATENT DOCUMENTS

| | | |
|---|---|---|
| EP | 2587347 | 5/2013 |
| EP | 3142185 | 3/2017 |
| JP | 4635788 | 2/2011 |
| JP | 6694053 | 5/2020 |
| KR | 20150093708 | 8/2015 |
| KR | 20170007447 | 1/2017 |
| KR | 1020170012422 | 2/2017 |
| WO | 2016022770 | 2/2016 |

OTHER PUBLICATIONS

"International Search Report and Written Opinion", PCT Application No. PCT/US2018/024957, dated Jul. 20, 2018, 8 pages.
"EP Appeal Decision", European Application No. 10194359.5, dated May 28, 2019, 20 pages.
"Galaxy S4 Air Gesture", Galaxy S4 Guides, https://allaboutgalaxys4.com/galaxy-s4-features-explained/air-gesture/, 4 pages.
"Samsung Galaxy S4 Air Gestures", Video from https://www.youtube.com/watch?v=375Hb87yGcg, May 7, 2013.
"Foreign Notice of Allowance", JP Application No. 2019-551574, dated Jul. 28, 2020, 5 pages.

(Continued)

*Primary Examiner* — Bo Fan
(74) *Attorney, Agent, or Firm* — Colby Nipper PLLC (57) ABSTRACT

This document describes techniques using, and devices embodying, radar-based force sensing. These techniques and devices can enable a great breadth of forces to be measured. Furthermore, radar-based force sensing enables those forces to use, control, and interact with devices.

20 Claims, 9 Drawing Sheets

(56) References Cited

OTHER PUBLICATIONS

"Foreign Office Action", Australian Application No. 2018316712, dated Jun. 10, 2020, 3 pages.
"Foreign Office Action", Korean Application No. 1020197026963, dated Aug. 31, 2020, 6 pages.
"Foreign Office Action", Canadian Application No. 3061012, dated May 21, 2020, 4 pages.
"International Preliminary Report on Patentability", PCT Application No. PCT/US2018/024957, dated Feb. 27, 2020, 7 pages.
"Foreign Notice of Allowance", KR Application No. 10-2019-7026963, dated Dec. 30, 2020, 3 pages.
"Foreign Office Action", RU Application No. 2019134808, dated Sep. 2, 2020, 13 pages.
"Foreign Office Action", IN Application No. 201947038485, dated Apr. 25, 2021, 7 pages.

* cited by examiner

RADAR-BASED FORCE SENSING

BACKGROUND

Force sensors are used in a variety of devices and industries, including robots, weight scales, development and manufacturing processes, safety testing, and performance testing. In many cases, it is desirable to use a force sensor that provides long-term reliability and high sensitivity.

In general, conventional force sensors are selected based on an operating environment and the types of forces to be measured. This leads to a variety of different force sensors having different rated capacities (e.g., maximum measurable force) and environmental dependences including temperature, humidity, pressure, electrical power changes, and radio-frequency interference.

Furthermore, these conventional force sensors are physically connected to a structure in order to experience a same force as the structure. This can make installation of the conventional force sensors challenging, especially when measuring forces over a large region or within small structures. Conventional force sensors are also limited to measuring forces along a principal axis, which may not coincide with a direction of the total applied force. As such, multiple force sensors may be required to measure different force directions, increasing a size and complexity of the force-sensing system.

SUMMARY

This document describes techniques and systems for radar-based force sensing. These techniques and devices can accurately characterize a force applied to a reflective surface. The radar-based force sensing can measure a variety of forces of varying magnitude and direction in a variety of operating environments. These characterizations can be used to provide force data to a computing device. In some aspects, the force data may be used to control the computing device.

This summary is provided to introduce simplified concepts concerning radar-based force sensing, which is further described below in the Detailed Description. This summary is not intended to identify essential features of the claimed subject matter, nor is it intended for use in determining the scope of the claimed subject matter.

BRIEF DESCRIPTION OF THE DRAWINGS

Embodiments of techniques and devices for radar-based force sensing are described with reference to the following drawings. The same numbers are used throughout the drawings to reference like features and components.

DETAILED DESCRIPTION

Overview

This document describes techniques and devices enabling radar-based force sensing. These techniques and devices enable a great breadth of forces and uses for those forces, such as forces to use, control, and interact with various devices, from smartphones to refrigerators. The techniques and devices are capable of providing a radar field that can sense forces using relatively small radar systems, even those that can be included within small devices. Furthermore, these forces can be accurately measured without requiring a large amount of power, hardware that can wear out over time, or specific operating environments.

This document now turns to an example environment, after which example radar-based force-sensing systems, example methods, and an example computing system are described.

Example Environment

Figure 1:
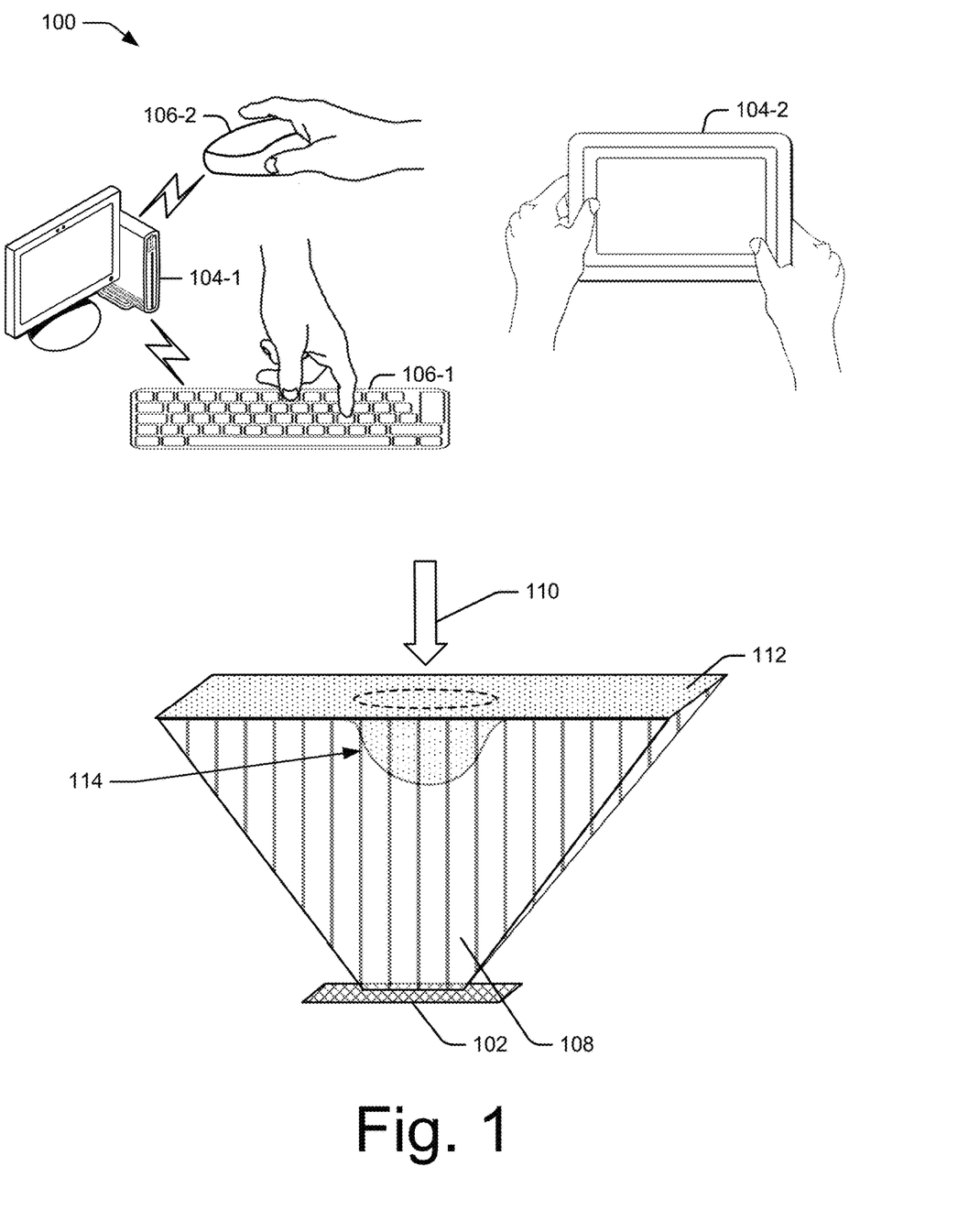
FIG. 1 illustrates an example environment in which radar-based force sensing can be implemented.

FIG. 1 is an illustration of an example environment 100 in which techniques using, and an apparatus including, a radar-based force-sensing system 102 may be embodied. Environment 100 includes three devices and techniques for using radar-based force-sensing system 102. In a first example, radar-based force-sensing system 102 is embedded in a peripheral device, such as keyboard 106-1 and computer mouse 106-2, and enables a force applied to the peripheral device to interact with desktop computer 104-1. In a second example, radar-based force-sensing system 102 enables a force applied to a exterior of the tablet 104-2 to interact with the tablet 104-2.

Keyboard 106-1 and computer mouse 106-2 are associated with radar-based force-sensing system 102 and these devices work together to improve user interaction with desktop computer 104-1. An exterior of the keyboard 106-1 and computer mouse 106-2 can be smooth, flexible, and continuous with graphics that outline regions where conventional keys or buttons would exist. Inside keyboard 106-1 and computer mouse 106-2, the radar-based force-sensing system 102 provides a radar field 108 that reflects off a reflective surface 112 of the keyboard's 106-1 and the computer mouse's 106-2 exterior.

A user interacts with the desktop computer 104-1 by applying a force 110 to the reflective surface 112. The applied force 110 causes a deformation 114, which the radar-based force-sensing system 102 detects and uses to measure characteristics of the force 110 (e.g., magnitude, location, direction, movement). The force characteristics are then associated with a user input and communicated to the desktop computer 104-1. In this way, the user can type by pressing different regions on the keyboard 106-1 or scroll by moving a finger across the computer mouse 106-2.

The force characteristics expand the types of inputs a user can provide to interact with the desktop computer 104-1. For example, a stronger force (e.g., harder tap) on the keyboard 106-1 can be used to automatically capitalize a typed character. On the computer mouse 106-2, a horizontal motion of a finger over the surface can cause the desktop computer 104-1 to horizontally scroll through a document or move a cursor. The computer mouse 106-2 can also be leaned towards a direction to move the cursor or adjust a zoom setting on the desktop computer 104-1. In some cases, the keyboard 106-1 can provide multiple functions, such as a track mouse or a drawing pad.

The forces can also be customized for each user. Users with different-sized hands may customize the keyboard 106-1 for ergonomic comfort by associating different locations on the reflective surface 112 with different keys. Users with a lighter touch may customize a sensitivity of the keyboard 106-1 so that a smaller magnitude force can be applied. Additionally, a same force can be used for different control inputs, such as enabling a user to customize the computer mouse 106-2 for right-handed or left-handed user.

Similarly, consider an exterior of tablet 104-2 that includes a display screen and/or a case that can deform. The reflective surface 112 can be an interior surface or a separate layer underneath the exterior of the tablet 104-2. The radar-based force-sensing system 102 can be embedded inside the tablet 104-2 to detect these deformations, enabling the tablet 104-2 to be controlled without physical buttons or conventional touch-screen technology. By detecting and measuring forces exerted on the tablet 104-2, the radar-based force-sensing system can detect whether a user is present and holding the tablet 104-2. Furthermore, a physical orientation of the tablet 104-2 can be determined based on the surfaces the user is holding or by measuring gravitational forces that cause a proof mass to deform another reflective surface. In many aspects, the radar-based force-sensing system 102 can replace a variety of different sensors that provide these features, including cameras, gyroscopes, and accelerometers.

Radar-based force-sensing system 102 can interact with applications or an operating system of computing device 104, or remotely through a communication network by transmitting input associated with the measured forces. The forces can be mapped to various applications and devices, thereby enabling control of many devices and applications. Many complex and unique forces can be recognized by radar-based force-sensing system 102 including those that are small, large, continuous, discrete, moving, stationary, at a single location, and across multiple locations. Radar-based force-sensing system 102, whether integrated with the computing device 104, having computing capabilities, or having few computing abilities, can each be used to interact with various devices and applications.

Example radar-based force-sensing systems are illustrated in FIG. 1, in which a user may provide complex or simple forces with his or her body, finger, fingers, hand, or hands (or a device like a stylus) to cause the reflective surface 112 to deform. Example forces include the many forces usable with current touch-sensitive displays, such as swipes, two-finger pinch, spread, rotate, tap, and so forth. Other forces are enabled that are complex, or simple but three-dimensional, examples include non-stationary forces caused by writing or drawing on the reflective surface 112, different-magnitude forces caused by pressing lightly or heavily on the reflective surface 112, and different-sized forces caused by pressing a single finger or an entire hand on the reflective surface 112. In addition to forces caused by a user, the radar-based force-sensing system can also measure forces generated by gravity, sound waves, and mechanical vibrations. These are but a few of many forces that can be sensed as well as mapped to particular devices or applications, such as to authenticate a user, detect a user's presence, turn on (e.g., wake up) a device, provide a number of physical steps detected for a fitness application, and detecting an orientation of the device.

Figure 2:
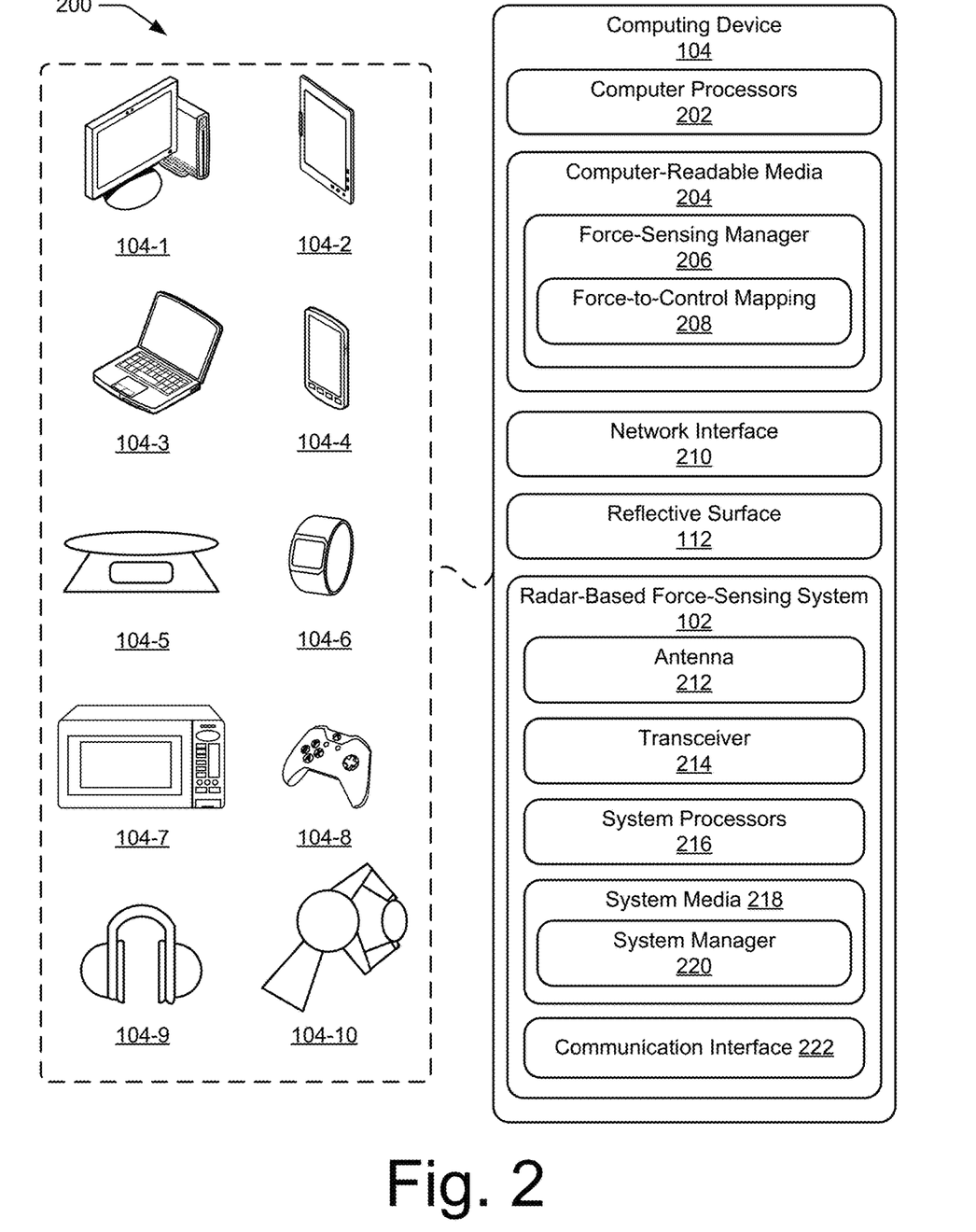
FIG. 2 illustrates the radar-based force-sensing system in detail.

In more detail, consider FIG. 2, which illustrates radar-based force-sensing system 102 as part of computing device 104. Computing device 104 is illustrated with various non-limiting example devices, the noted desktop computer 104-1, tablet 104-2, as well as laptop 104-3, smart phone 104-4, scale 104-5, computing watch 104-6, microwave 104-7, and video-game controller 104-8. The computing device 104 can also include noise-cancelling headphones 104-9 that use the radar-based force-sensing system 102 to measure vibrations caused from noise in an environment for determining a noise-cancelling field. The computing device 104 can also include a robot 104-10 that uses the radar-based force-sensing system 102 to measure a grip force and provide feedback to control an amount of force the robot applies. In this way, the robot can hold an object without breaking or dropping the object. Other devices may also be used, such as haptic gloves, televisions, electronic piano keyboards, anthropomorphic test devices (e.g., vehicle crash-test dummies), track pads, drawing pads, netbooks, e-readers, tire pressure sensors, accelerometers, home-automation and control systems, other home appliances, security systems, and testing systems. Note that computing device 104 can be wearable, non-wearable but mobile, or relatively immobile (e.g., desktops and appliances).

The radar-based force-sensing system 102 can be used as a stand-alone force sensor or used with, or embedded within, many different computing devices or peripherals, such as in control panels that control home appliances and systems, in automobiles to control internal functions (e.g., volume, cruise control, or even driving of the car), or as an attachment to a laptop computer to control computing applications on the laptop.

Computing device 104 includes one or more computer processors 202 and computer-readable media 204, which includes memory media and storage media. Applications and/or an operating system (not shown) embodied as computer-readable instructions on computer-readable media can be executed by computer processors 202 to provide some of the functionalities described herein. Computer-readable media 204 also includes force-sensing manager 206, which can implement force-to-control mapping 208. The force-to-control mapping 208 can recognize the applied force 110 and map the applied force 110 to a pre-configured control input associated with an application on the computing device 104. The force-sensing manager 206 can also provide users the ability to customize the forces for various control inputs and calibrate the radar-based force-sensing system 102.

Computing device 104 may also include network interface 210 for communicating data over wired, wireless, or optical networks. For example, network interface 210 may communicate data over a local-area-network (LAN), a wireless local-area-network (WLAN), a personal-area-network (PAN), a wire-area-network (WAN), an intranet, the Internet, a peer-to-peer network, point-to-point network, a mesh network, and the like. Computing device 104 may also include a display (not shown).

The computing device 104, or another device that is associated with the computing device 104, includes the reflective surface 112 through which applied forces can be sensed by the radar-based force-sensing system 102. The reflective surface 112 can be made of any type of material, such as rubber, polyethylene, textiles, aluminum, steel, glass, and wood. For materials that do not readily reflect the radar field 108, a reflective material (e.g., aluminum, copper, gold, silver, or a combination thereof) can be applied (e.g., coated, sputtered, molded, woven) to the reflective surface 112. In some aspects, the reflective material, or absence of the reflective material, can be configured at specific points across the reflective surface 112 to enable the radar-based force-sensing system 102 to track these points and detect the deformation 114 based on these points. A flexible or stretchable material can be used for the reflective surface 112 to provide the user a feeling of touch. Multiple rigid segments can also be joined and configured to move based on the applied force 110. The reflective surface 112 may further exaggerate the deformation to enable small forces to be readily detected by the radar-based force-sensing system 102.

A compliant layer that is transparent to the radar field 108 can be positioned between the reflective surface 112 and the radar-based force-sensing system 102. The compliant layer can include air, an air bladder, silicone, foam, a conformal lattice structure, and/or a spring. The compliant layer can be configured to separate the reflective surface 112 and the radar-based force-sensing system 102 to enable the reflective surface 112 to deform.

Figure 3:
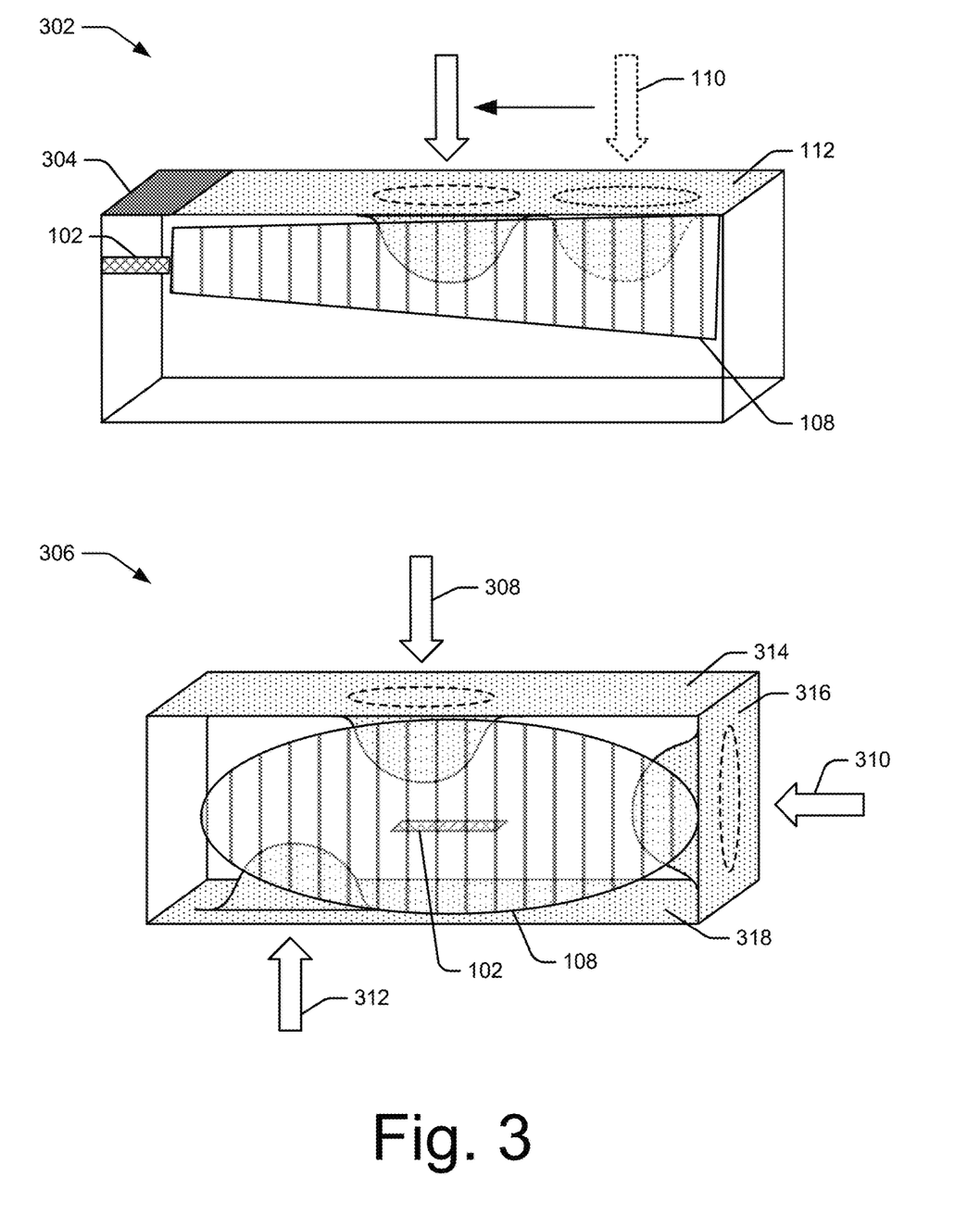
FIG. 3 illustrates example configurations of the radar-based force-sensing system.

Depending on an application, the radar-based force-sensing system 102 can be positioned significantly below the reflective surface 112 to project the radar field 108 up towards the reflective surface 112, as depicted in FIG. 1. FIG. 3 depicts another configuration at 302 in which the radar-based force-sensing system 102 is positioned to a side of the reflective surface 112. In this way, the radar field 108 is projected across the reflective surface 112. This configuration may be used to directly measure motion of the applied force 110 by measuring a Doppler frequency shift in the received reflections. In some aspects, instead of the reflective surface 112, a rigid surface 304 that does not readily deform may be positioned above the radar-based force-sensing system 102. FIG. 3 includes an additional configuration at 306, in which the radar-based force-sensing system 102 is an omnidirectional radar that projects the radar field 108 in all directions to measure multiple forces 308, 310, and 312 on multiple reflective surfaces 314, 316, and 318.

Returning to FIG. 2, the radar-based force-sensing system 102 includes an antenna 212 and a transceiver 214 to provide the radar field 108 (e.g., transmit and receive radar signals). The radar field 108 can be a contiguous field or a beam-scanning field, a steered or un-steered field, a wide or narrow field, or a shaped field (e.g., hemisphere, cube, fan, cone, cylinder). The shape and steering of the field can be achieved using digital beamforming techniques and configured based on a size of the reflective surface 112 or an estimated location of the deformation 114. Thus, the radar-based force-sensing system can easily detect forces over a wide region or across separate regions (e.g., on two opposite sides of a device). In some aspects, multiple antennas and transceivers can be positioned at different locations to observe different regions or a same region.

A range of the radar-based force-sensing system 102 can be configured based on a distance to the reflective surface 112, such as between one millimeter and 30 meters. This distance can be further based on an amount the reflective surface 112 is configured to deform to ensure the radar-based force-sensing system 102 can detect the deformation 114 without being damaged by the deformation 114.

The radar-based force-sensing system 102 can be configured for continuous wave or pulsed radar operations. A variety of modulations can be used, including linear frequency modulation (FM), stepped frequency modulations, and phase modulations. Radar-based force-sensing system 102 can be configured to emit microwave radiation in a 1 GHz to 300 GHz range, a 3 GHz to 100 GHz range, and narrower bands, such as 57 GHz to 63 GHz, to provide the radar field 108. The frequency can be selected based on reflective properties of the reflective surface 112. The radar-based force-sensing system 102 can also be configured to have a relatively fast update rate, which can aid in detecting short duration forces as well as active formation of the deformation 114. By utilizing modulation and digital beamforming techniques, the radar-based force-sensing system 102 can provide high range resolution and high cross-range resolution to measure small forces applied to the reflective surface (e.g., provide high sensitivity). In this way, the radar-based force-sensing system 102 can detect deformations on the order of meters to micrometers.

Radar-based force-sensing system 102 may also include one or more system processors 216 and system media 218 (e.g., one or more computer-readable storage media). System media 218 includes system manager 220, which can process the received reflections. The system manager 220 can detect the deformation 114 and produce force data that characterizes the applied force 110 based on the detected deformation 114 (described in further detail below). The force data can be in the form of minimally processed in-phase and quadrature data, range-Doppler maps, and/or measured characteristics of the applied force 110 (e.g., location, magnitude, direction, movement). Radar searching and tracking techniques can also be implemented by the system manager 220 to detect the deformation 114. In some aspects, the system manager 220 can control characteristics of the radar field 108 by sending commands to the transceiver. Furthermore, these commands can be based on information received from the computing device 104, such as when the force-sensing manager 206 enables a user to provide a force to customize control of the computing device 104.

The radar-based force-sensing system 102 also includes a communication interface configured to transmit the force data to a remote device, though this need not be used when radar-based force-sensing system 102 is integrated with computing device 104. When included, the force data can be provided in a format usable by the remote computing device sufficient for the remote computing device to measure characteristics of the applied force 110 in those cases where the characteristics are not determined by the radar-based force-sensing system 102 or computing device 104.

Figure 4:
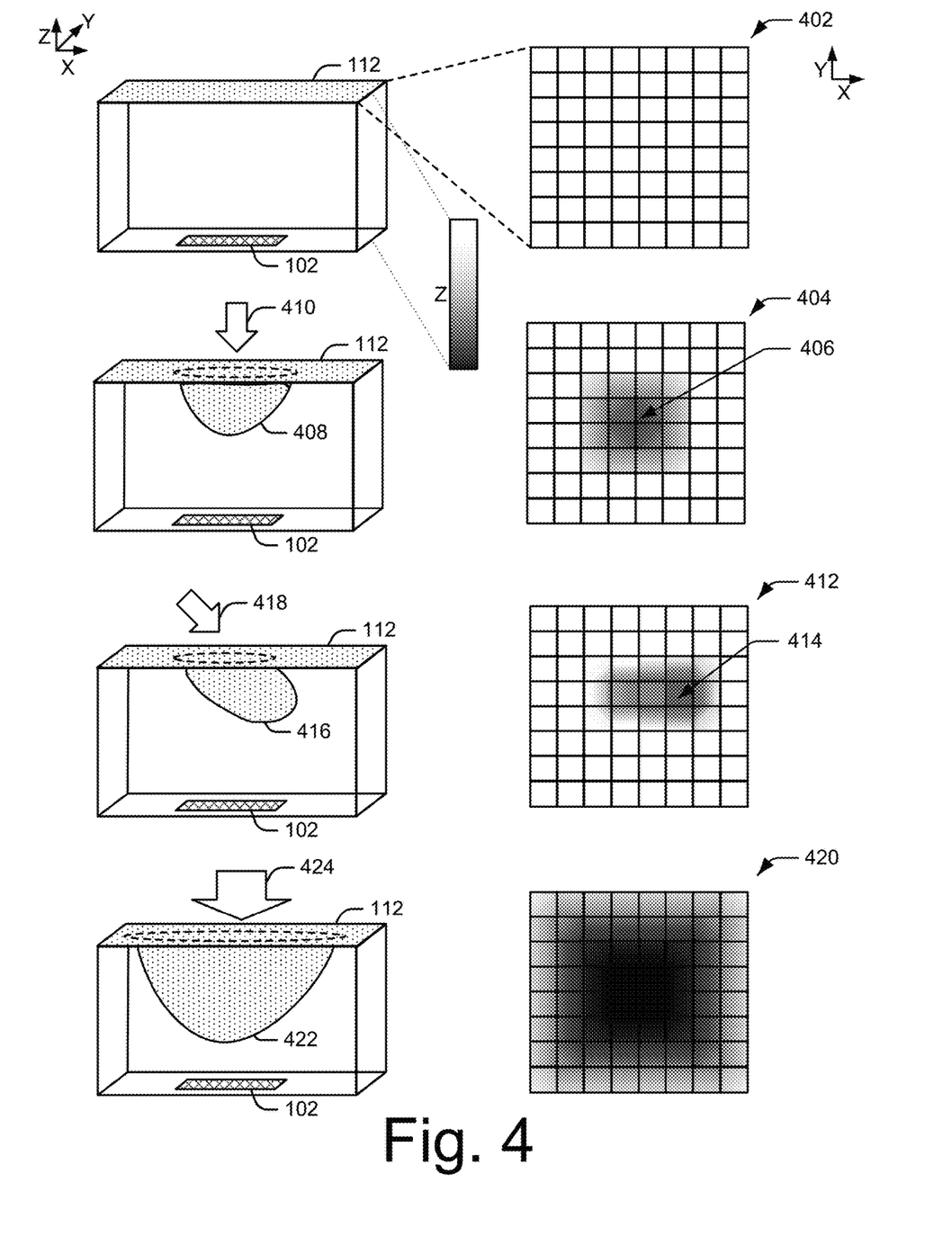
FIG. 4 illustrates example forces that the radar-based force-sensing system can measure.

FIG. 4 illustrates example forces that the radar-based force-sensing system 102 can measure. For explanation purposes, the forces depicted cause the reflective surface 112 to deform inwards towards the radar-based force-sensing system 102. Other forces can also be measured that cause the reflective surface 112 to deform outward, bend, twist, stretch, and compress. Additionally, the deformations depicted are magnified for illustration purposes.

In FIG. 4, example forces and deformations are shown with corresponding maps of the reflective surface 112. The maps can be generated by the system manager 220 by analyzing the reflected radar signals and measuring a distance of the reflective surface 112 (e.g., range) across different azimuth and elevation regions. The maps illustrate planar (e.g., X and Y) and vertical (e.g., Z) dimensions of the reflective surface 112 where the grid lines represent sub-regions on the reflective surface 112. A shading of the map represents a distance (e.g., range) of the reflective surface 112 at these sub-regions with respect to the radar-based force-sensing system such that closer distances are indicated with darker shading and farther distances are indicated with a lighter shading. A length and width of the reflective surface 112 can also be measured and illustrated via the map to measure forces that causes the reflective surface 112 to expand or contract.

Map 402 illustrates a baseline when no external force is applied to the reflective surface 112. This baseline can be used to measure imperfections and natural deformations in the reflective surface 112 so that the system manager 220 or force-sensing manager 206 can account for these in later-collected force data. As depicted, map 402 illustrates the reflective surface 112 is flat with no variation in the vertical dimension (e.g., no change in depth of the reflective surface 112).

Map 404 depicts a variation in depth of the reflective surface 112 at sub-region 406. The variation is associated with deformation 408, which is caused by force 410. A maximum depth of the deformation 408 is associated with a magnitude of the force 410, enabling the system manager 220 to determine the magnitude of the force 410. The magnitude can be further determined based on calibration information in order to provide the magnitude in terms of conventional units of measurement (e.g., newtons, pounds, grams). Additionally, the magnitude can be determined based on a difference between the maximum depth at sub-region 406 and a reference depth, such as a nominal depth or a previously-measured depth for the same sub-region on the reflective surface 112 (e.g., using map 402).

Map 412 depicts a variation in depth of the reflective surface 112 at sub-region 414. The variation is associated with deformation 416, which is caused by force 418. Map 412 illustrates that in addition to measuring force's 418 magnitude, a direction (e.g., angle with respect to the reflective surface 112) of the force 110-2 can be measured by analyzing the change in depth across the reflective surface 112. As seen in map 404, the change in depth is symmetrical around the maximum depth at 406. In contrast, map 412 shows the depth gradually decreasing towards the left from the maximum depth at 406. A slope at which the depth changes can be used to measure the force's 418 angle (e.g., 45 degrees).

Map 420 depicts force data associated with deformation 422, which is caused by force 424. In comparing map 420 to maps 404 and 412, a magnitude of force 424 is larger than the magnitude of force 410 and force 418 because the distance between the radar-based force-sensing system 102 and the deformation 422 is smaller. In addition, another measured characteristic of the force 424 is a size of a region on the reflective surface 112 over which the force is applied. In map 420, a size of the deformation 422 is larger compared to maps 404 and 412 because the force 424 is applied over a larger region.

Figure 5:
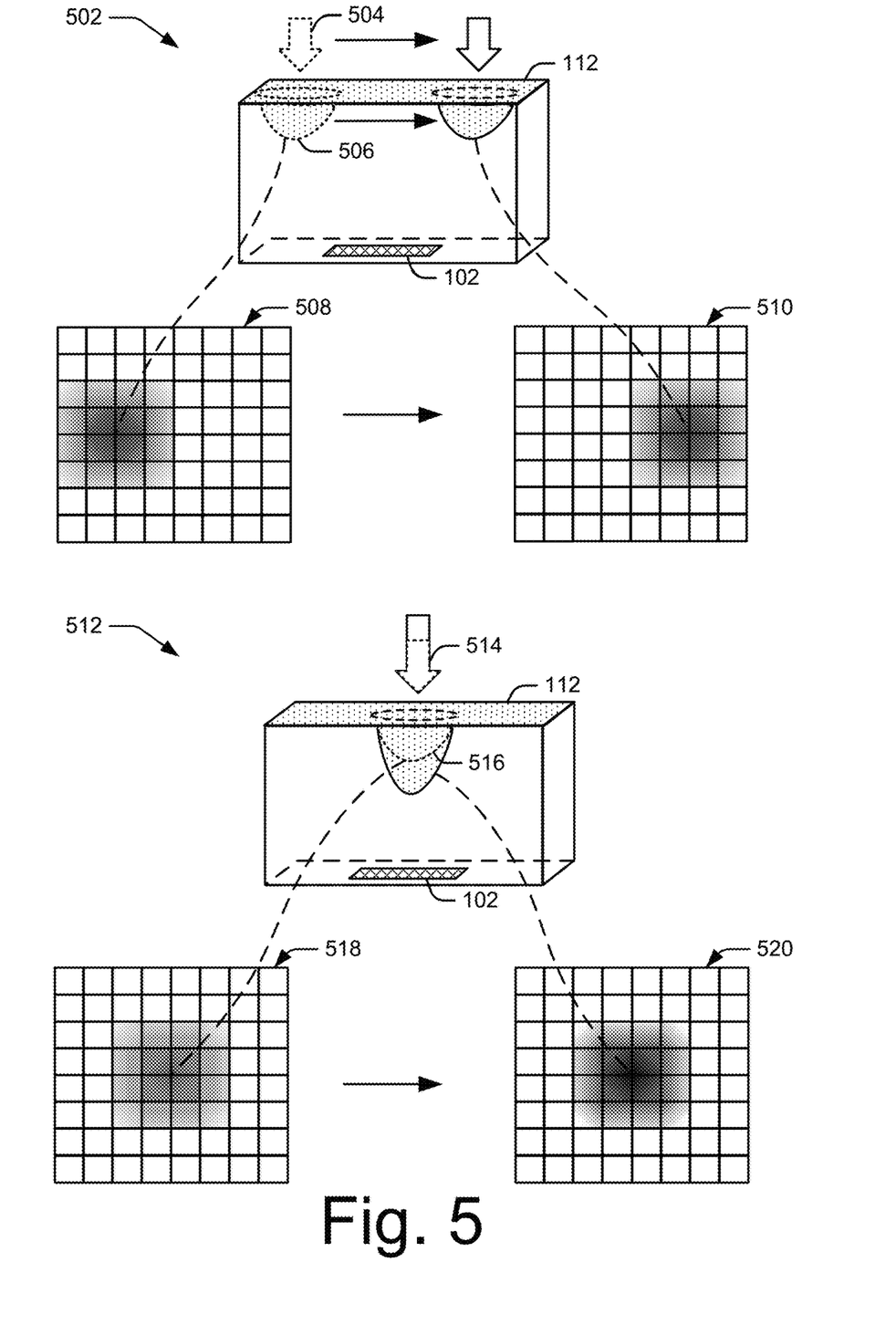
FIG. 5 illustrates example moving forces that the radar-based force-sensing system can measure.

FIG. 5 illustrates example moving forces that the radar-based force-sensing system 102 can measure. At 502, force 504 and deformation 506 moves to the right across the reflective surface 112. The radar-based force-sensing system can produce map 508 and map 510 at different times. A velocity of force 504 can be measured as a change in distance (e.g., difference in location of the maximum depth in map 508 and map 510) over the change in time.

At 512, force 514 increases in magnitude, causing deformation 516 to increase in depth. A rate at which the force 514 increases can be measured using the technique described above by measuring the change in depth over time. Additionally, the radar-based force-sensing system can measure a Doppler frequency shift in the received reflected signals to measure the rate at which the force 514's magnitude changes.

As described above, the radar-based force-sensing system 102 can provide multiple maps illustrating a time lapse of different applied forces or changes in the applied forces. This force data can be stored for off-line analysis or used to provide real-time video feedback to a user. These techniques can be further used to determine a frequency of an occurrence of the applied force as well as measure vibrations of the reflective surface 112.

Example Methods

Figure 6:
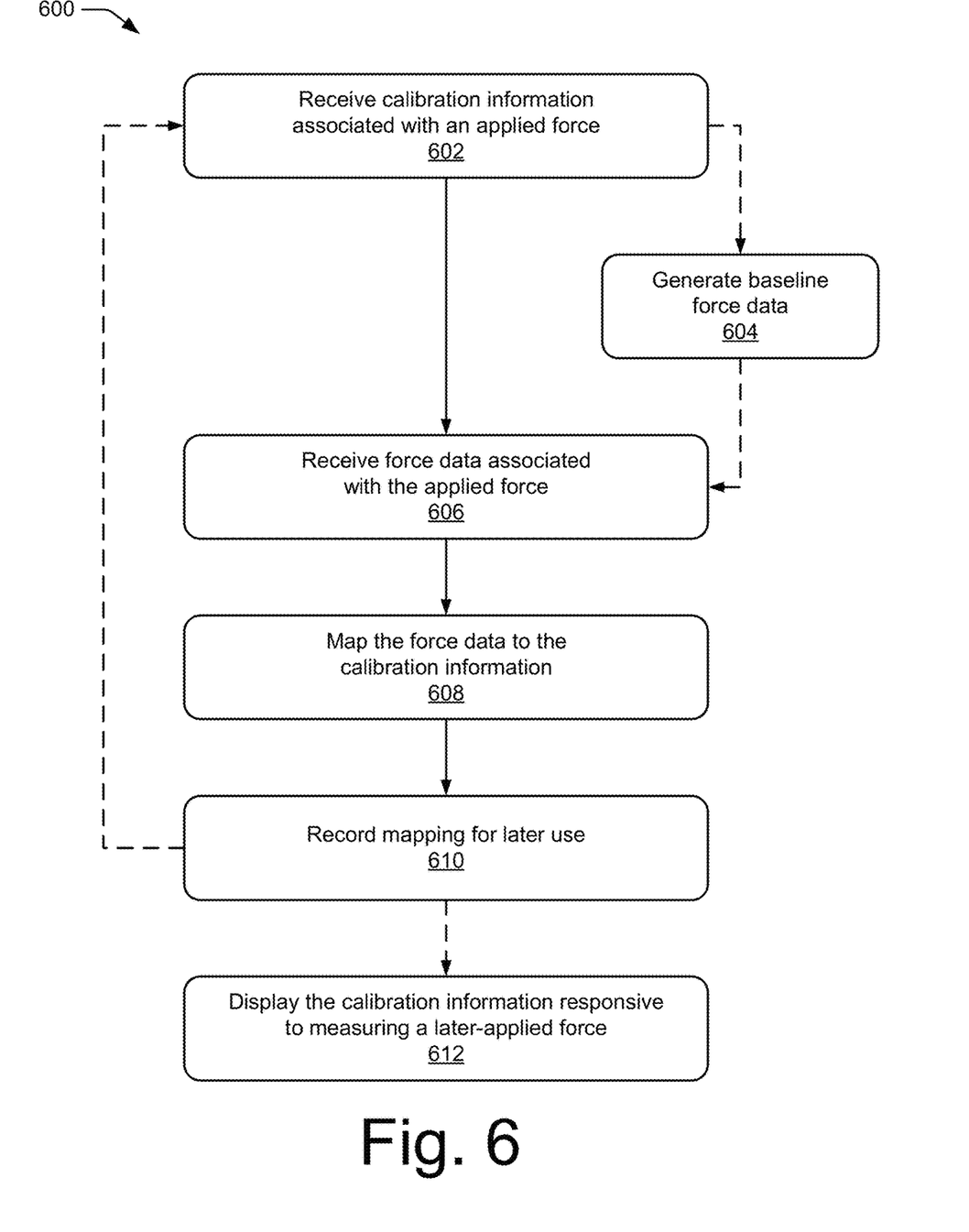
FIG. 6 illustrates an example method for calibrating force measurement.
Figure 7:
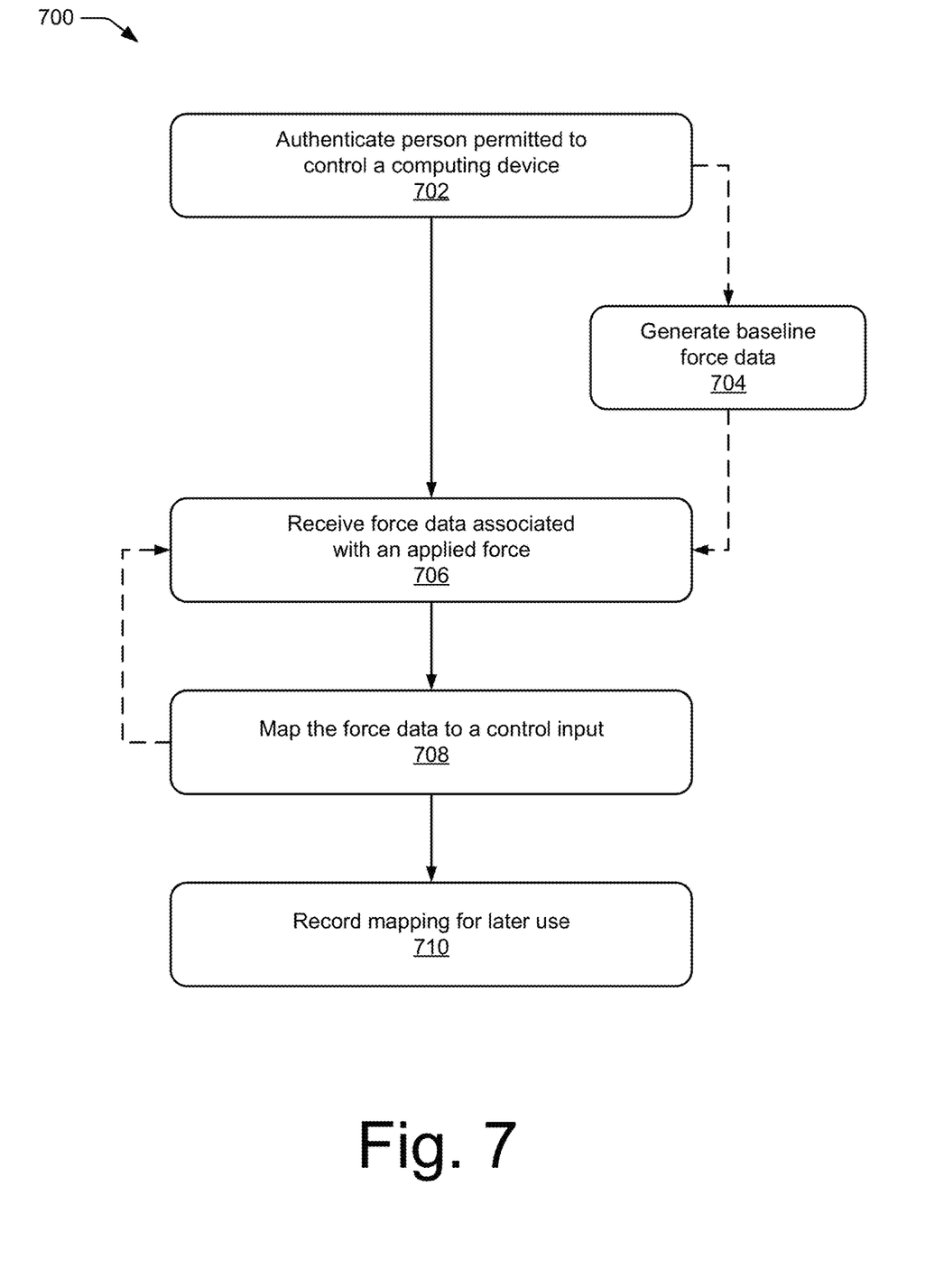
FIG. 7 illustrates an example method for enabling better recognition of a force.
Figure 8:
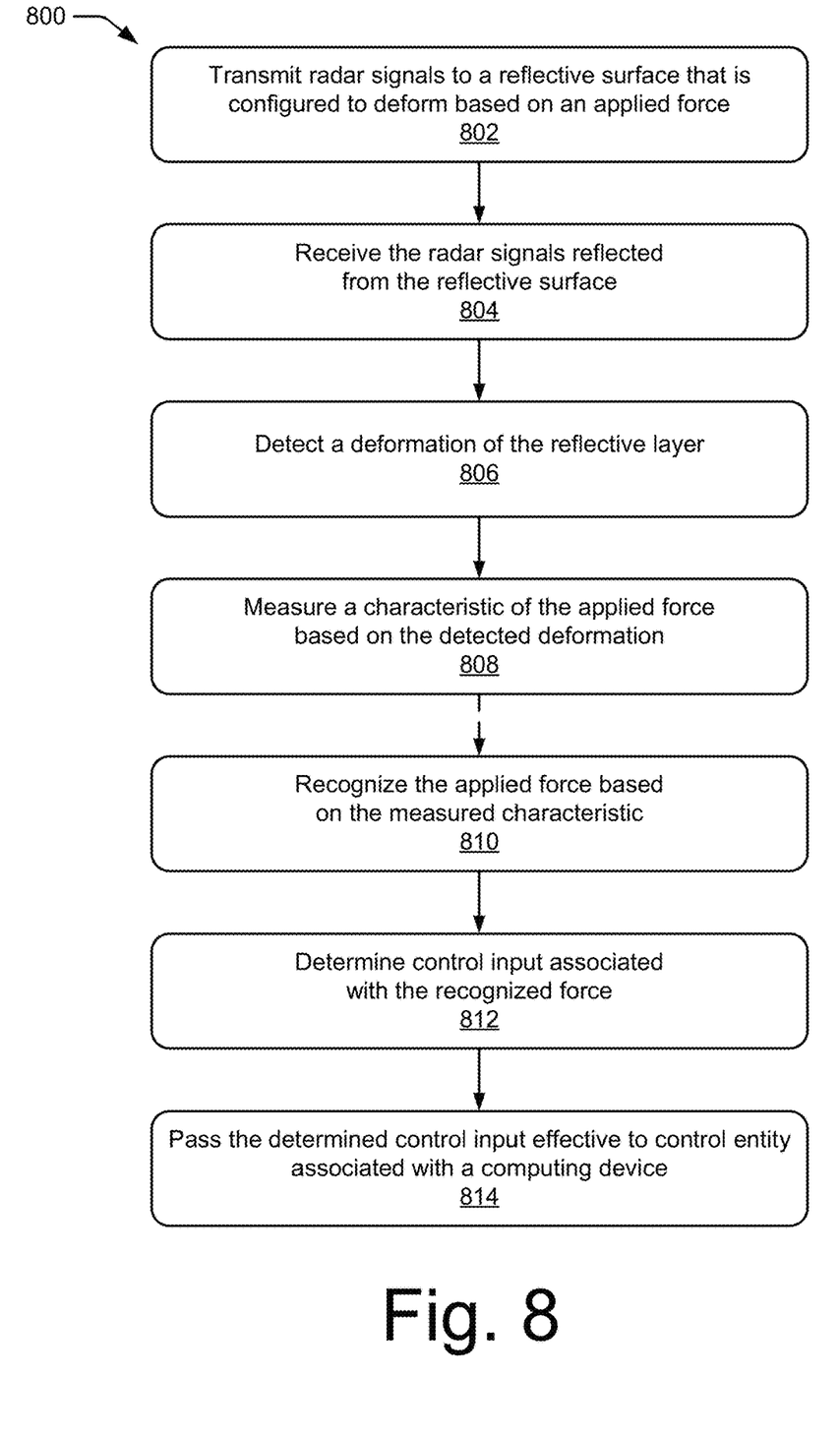
FIG. 8 illustrates an example method enabling radar-based force sensing.

FIGS. 6, 7, and 8 depict methods enabling radar-based force sensing. Method 600 can be performed to calibrate measurement of the applied force. Method 700 can be performed to better-enable later recognition of an applied force. Method 800 enables force sensing, and can be performed separate from or integrated in whole or in part with method 600 and method 700. These methods and other methods herein are shown as sets of operations (or acts) performed but not necessarily limited to the order or combinations in which the operations are shown herein. Further, any of one or more of the operations may be repeated, combined, reorganized, or linked to provide a wide array of additional and/or alternate methods. In portions of the following discussion, reference may be made to environment 100 of FIG. 1 and entities detailed in FIG. 2, reference to which is made for example only. The techniques are not limited to performance by one entity or multiple entities operating on one device.

Method 600 enables calibration for radar-based force sensing. The calibration enables the radar-based force-sensing system 102 to measure the applied force in conventional units, such as newtons, pounds, and grams. Additionally, the calibration information enables the radar-based force-sensing system 102 to be tuned for different reflective surfaces, imperfections or natural deformations in the reflective surface, and/or existence of other objects within the radar field.

At 602, calibration information associated with an applied force is received. Force-sensing manager 206 may prompt a user to provide the calibration information, such as in text: "enter weight." Alternatively, the calibration information may be stored in the computer-readable media 204 and read by the force-sensing manager 206.

Optionally at 604, baseline force data can be generated when no additional force is applied to the reflective surface 112. Force-sensing manager 206 may command radar-based force-sensing system 102 to measure the baseline force data. The baseline force data enhances accuracy of the radar-based force-sensing system 102 by enabling imperfections and natural deformations in the reflective surface 112 to be taken into account in later-measured force data. During the baseline collection, the radar-based force-sensing system can also detect objects that are not of interest but exist within the radar field 108. These objects can be added to a clutter map to enable the radar-based force-sensing system to automatically determine constraints and thresholds (e.g., minimum Doppler, minimum range, physical region) that discriminate these objects and mitigate an impact these objects have on the force data. These constraints and thresholds can also be pre-determined and provided to the radar-based force-sensing system during installation or during the calibration process. The force-sensing manager 206 may record the baseline force data for later-reference.

At 606, force data associated with the applied force is received. This force data can then be recorded as an aid to improve mapping later-received force data to calibration information, as the manner in which the reflective surface 112 deforms may vary depending on the type of material (e.g., flexible or rigid), the operating environment (e.g., different temperatures or atmospheres), or the region on the reflective surface 112 (e.g., at a middle or at an edge). Force-sensing manager 206 may cause radar-based force-sensing system 102 to provide a radar field, receive a reflection from a reflective surface having a deformation caused by the applied force, and generate the force data based on the detected deformation.

At 608, the received force data is mapped to the calibration information. This mapping may be as simple as a look-up table that maps measured force characteristics to the calibration information. For example, a depth of a deformation can be mapped to a weight of an object on the reflective surface. Additionally, the mapping can include additional information that can be used to estimate measurement accuracy and compensate for short-term fluctuations, such as signal-to-noise ratios and noise levels. The mapping may include force data that is minimally processed (e.g., maps of the reflective surface 112 as shown in FIG. 3 and FIG. 4, in-phase and quadrature data, range-Doppler maps) or measured characteristics of the force (e.g., location, magnitude, direction, movement).

At 610, the mapping of the force data and the calibration information is recorded for later use. All or parts of the force data may be recorded for the mapping, such as a complete map of the reflective surface or a few measured characteristics of the applied force that relate to the calibration information. The recording enables a later-applied force to be associated with the calibration information. For example, a magnitude of the later-applied force, although measured with respect to a depth of the deformation, can be measured in units of pounds.

At 612, the calibration information can be displayed responsive to measuring a later-applied force. For example, scale 104-5 in FIG. 2, can display a measured weight of an object causing the reflective surface 112 to deform based on a measured depth of the deformation and the mapping that associates the later-applied force to the calibration information.

The operations can be repeated to provide multiple references relating different calibration information to different force data. The force-sensing manager 206 can use the multiple references for extrapolation or interpolation to estimate the calibration information associated with a later-applied force. Additionally, as the manner in which the reflective surface 112 deforms may vary depending on the type of material (e.g., flexible or rigid), the operating environment (e.g., different temperatures or atmospheres), or the region on the reflective surface 112 (e.g., at a middle or at an edge), the operations can be repeated to relate different force data to a same calibration information. In this way, the radar-based force-sensing system 102 can be calibrated to the reflective surface and a variety of operating environments.

The calibration process described above improves accuracy of the radar-based force-sensing system by generating force data that can be used to directly account for various deformation characteristics of the reflective surface 112, without complex modeling or advanced simulation. Other calibration techniques can also be used to enable the radar-based force-sensing system to measure characteristics of the force in conventional units, such as providing a direct mapping between different deformation depths and force magnitudes.

Method 700 enables recognition improvement for a later-applied force. At 702, a person permitted to control a computing device is authenticated. This authentication can be performed in various manners known in the art for authenticating persons generally, such as receiving authentication credentials and confirming that these credentials match the person.

In some cases, however, authenticating the person permitted to control the computing device authenticates the person based on an applied force. For example, force-sensing manager 206 may cause the radar-based force-sensing system 102 to provide a radar field, detect a deformation on a reflective surface, measure a characteristic of the applied force, and confirm that the characteristic matches a previously recorded characteristic for the person permitted to control the computing device. The applied force may be a single force that moves, such as a user drawing a symbol, or a sequence of successive forces, such as a user tapping different locations on the reflective surface. Furthermore, multiple characteristics of the applied force can be confirmed to match to recorded characteristics, such as location as well as depth, velocity, and direction.

Optionally at 704, baseline force data can be generated when no additional force is applied to the reflective surface 112 to further increase accuracy, similar to 604 in FIG. 6.

At 706, force data associated with an applied force is received. In some cases, the force data is received responsive to prompting the authenticated person for the applied force. Force-sensing manager 206 may present a force and its corresponding control input, such as in text: "press down and trace a circle" or showing an animation or video of the force, and then receive the force applied by the authenticated person. This force data can then be recorded as an aid to improve recognition, as the manner in which the force is made can vary from person to person. To do so, force-sensing manager 206 may cause radar-based force-sensing system 102 to provide a radar field, detect a deformation, generate the force data based on the detected deformation, and communicate the force data to the force-sensing manager 206. The force-sensing manager 206 may record the force data for later-reference in computer-readable media 204.

The force data may also be received responsive to presenting one or more control inputs and then measuring a force that is desired for use as that control. This permits users to decide on a force they want to use for that control. For example, a user may desire to use a force associated with a two-finger swipe on the reflective surface 112 to advance media or pages of a document. In this case, the force data can include a size of a region over which the force is applied to characterize the use of two fingers and movement of the force to characterize the swipe. As another example, a user may desire to use a single hard finger press on the reflective surface 112 to select content. The associated force data, in this case, can include a size of a region over which the force is applied to characterize the use of a single finger, a magnitude of the force to characterize how hard the finger was pressed, and a duration of time over which the force was applied to characterize how long the finger was pressed. Other measurements, such as a location of the force on the reflective surface 112, can also be used to map the force to the control input.

At 708, the received force data is mapped to a control input. This can be the control input already associated with a presented force, or a new force selected to be mapped to a control input, and so forth. This mapping can be as simple as a look-up table, for example, whether personalized and custom or otherwise. The look-up table can associate the received force data to the control input. In some aspects, the look-up table can include the measured force data, such as the measured characteristics of the applied force 110. In other aspects, the look-up table can include a reference to a location in the computer-readable media 204 that stores the force data for the control input, such as the in-phase and quadrature data, range-Doppler maps and/or the maps of the reflective surface 112.

At 710, the mapping of the applied force and the control input is recorded. The mapping can be associated with the authenticated person or the user of the computing device effective to enable a later-received force to be mapped to a control input associated with a person permitted to control the computing device.

Method 800 enables radar-based force sensing. At 802, radar signals are transmitted to a reflective surface that is configured to deform based on an applied force. In some aspects, system manager 220 may cause transceiver 214 to provide (e.g., project, emit, transmit) one of the described radar fields noted above.

At 804, the radar signals reflected from the reflective surface are received. The radar signals can be received by transceiver 214. As part of receiving the reflected radar signals, the radar signals are processed by the system manager 220. The system manager 220 can produce a map of the reflective surface depicting dimensions and motion of the reflective surface 112.

At 806, a deformation of the reflective surface is detected. The deformation can be detected by the system manager 220 based on a threshold, such as a range threshold (e.g., range from the radar-based force-sensing system 102 to the deformation), a minimum change in depth of the reflective surface 112, and/or a minimum Doppler frequency threshold. In some cases, the threshold can be associated with a location or region on the reflective surface 112 effective to only enable deformations in the identified location to be detected. The deformation can also be detected by comparing a current map of the reflective surface 112 to a baseline map in which no additional force was applied.

At 808, a characteristic of the applied force is measured based on the detected deformation. As described above, the characteristic can include location, magnitude, direction, movement, a size of a region over which the force is applied, and/or frequency of occurrence of the applied force. The characteristic can also be measured via in-phase and quadrature data, range-Doppler maps, and/or maps of the reflective surface. Additionally, the characteristic can be further related to calibration information in order to provide a conventional measurement of the characteristic of the applied force.

At 810, the applied force is recognized based on the measured characteristic. In some aspects, the applied force can be recognized directly. For example, the force-sensing manager 206 can use a measured duration of the applied force to recognize a tapping force or a holding force. As another example, the force-sensing manager 206 can use a measured Doppler or velocity to recognize a stationary force or a moving force.

In other aspects, the force-sensing manager 206 can recognize the applied force by associating the measured characteristic with a characteristic from a previously recorded force. The force-sensing manager 206 can access a database of recorded force data that is stored in the computer-readable media 204 and determine the recorded force data that best correlates with the applied force. The measured characteristic of the recorded force data and the applied force may be directly correlated in order to recognize the applied force. The measured characteristic of the recorded force data and the applied force may also be indirectly correlated via the in-phase and quadrature data, range-Doppler maps, and/or the maps of the reflective surface 112. Furthermore, multiple measured characteristics can be used to recognize the applied force and improve correlation.

At 812, the control input associated with the recognized force is determined. Determining the control input associated with the recognized gesture can be based on a mapping of the recognized force to a control input or multiple control inputs previously associated with measured forces. For example, the look-up table can be used to determine the control input associated with the recognized force. If there is more than one control input mapped to the recognized force, force-sensing manager 206 can determine which control input to associate the recognized force with based on other factors. These other factors may include control inputs associated with a currently executing program, a device having recently received a control input from the person, a most-common application or device for the user to control, various other historic data, and so forth.

At 814, the determined control input is passed to an entity effective to control the entity. As noted, this entity can be an operating system or application associated with computing device 104, though it may also be passed to a remote device directly from radar-based force-sensing system 102 or through computing device 104.

The preceding discussion describes methods relating to radar-based force sensing. Aspects of these methods may be implemented in hardware (e.g., fixed logic circuitry), firmware, software, manual processing, or any combination thereof. These techniques may be embodied on one or more of the entities shown in FIGS. 1, 2, and 9 (computing system 900 is described in FIG. 9 below), which may be further divided, combined, and so on. Thus, these figures illustrate some of the many possible systems or apparatuses capable of employing the described techniques. The entities of these figures generally represent software, firmware, hardware, whole devices or networks, or a combination thereof.

Example Computing System

Figure 9:
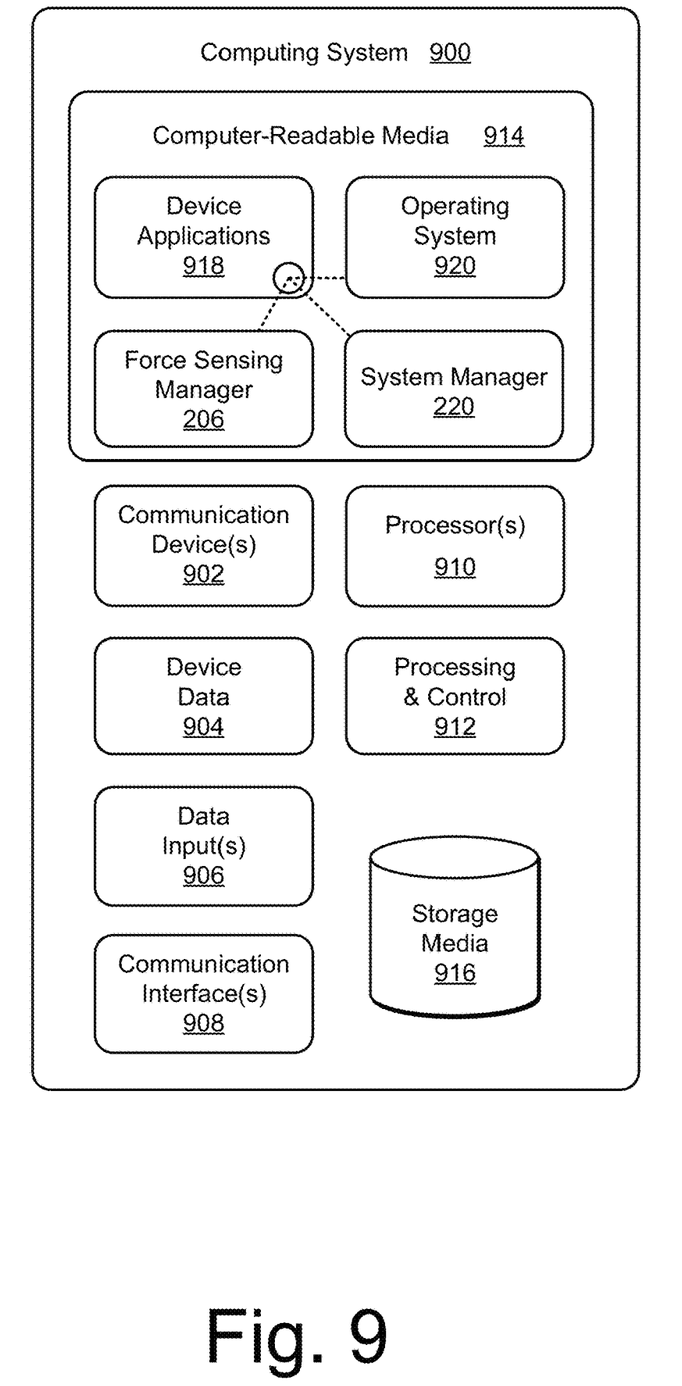
FIG. 9 illustrates an example computing system embodying, or in which techniques may be implemented that enable use of, radar-based force sensing.

FIG. 9 illustrates various components of example computing system 900 that can be implemented as any type of client, server, and/or computing device as described with reference to the previous FIGS. 1-8 to implement radar-based force sensing.

Computing system 900 includes communication devices 902 that enable wired and/or wireless communication of device data 904 (e.g., received data, data that is being received, data scheduled for broadcast, data packets of the data, etc.). Device data 904 or other device content can include configuration settings of the device, media content stored on the device, and/or information associated with a user of the device (e.g., an identity of an actor applying a force). Media content stored on computing system 900 can include any type of audio, video, and/or image data. Computing system 900 includes one or more data inputs 906 via which any type of data, media content, and/or inputs can be received, such as human utterances, force data, user-selectable inputs (explicit or implicit), messages, music, television media content, recorded video content, and any other type of audio, video, and/or image data received from any content and/or data source.

Computing system 900 also includes communication interfaces 908, which can be implemented as any one or more of a serial and/or parallel interface, a wireless interface, any type of network interface, a modem, and as any other type of communication interface. Communication interfaces 908 provide a connection and/or communication links between computing system 900 and a communication network by which other electronic, computing, and communication devices communicate data with computing system 900.

Computing system 900 includes one or more processors 910 (e.g., any of microprocessors, controllers, and the like), which process various computer-executable instructions to control the operation of computing system 900 and to enable techniques for, or in which can be embodied, radar-based force sensing. Alternatively or in addition, computing system 900 can be implemented with any one or combination of hardware, firmware, or fixed logic circuitry that is implemented in connection with processing and control circuits which are generally identified at 912. Although not shown, computing system 900 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Computing system 900 also includes computer-readable media 914, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Computing system 900 can also include a mass storage media device (storage media) 916.

Computer-readable media 914 provides data storage mechanisms to store device data 904, as well as various device applications 918 and any other types of information and/or data related to operational aspects of computing system 900. For example, an operating system 920 can be maintained as a computer application with computer-readable media 914 and executed on processors 910. Device applications 918 may include a device manager, such as any form of a control application, software application, signal-processing and control module, code that is native to a particular device, a hardware abstraction layer for a particular device, and so on.

Device applications 918 also any include system components, engines, or managers to implement radar-based force sensing. In this example, device applications 918 include force-sensing manager 206 and system manager 220.

Conclusion

Although techniques using, and apparatuses including, radar-based force sensing have been described in language specific to features and/or methods, it is to be understood that the subject of the appended claims is not necessarily limited to the specific features or methods described. Rather, the specific features and methods are disclosed as example implementations of radar-based force sensing.

What is claimed is:

1. A method comprising:
   transmitting, with a radar system, radar signals to a reflective surface that has a deformation caused by an applied force;
   receiving, via the radar system, the radar signals reflected from the reflective surface;
   detecting, via the radar system and based on the reflected radar signals, the deformation of the reflective surface; and
   measuring a characteristic of the applied force based on the detected deformation.

2. The method of claim 1, further comprising:
   mapping the characteristic of the applied force to an input for a computing device; and
   controlling the computing device based on the input.

3. The method of claim 1, wherein the characteristic of the applied force includes a location of the applied force on the reflective surface.

4. The method of claim 1, wherein the characteristic of the applied force includes a movement of the applied force across the reflective surface.

5. The method of claim 1, wherein the characteristic of the applied force includes a direction of the applied force.

6. The method of claim 1, wherein the characteristic of the applied force includes a size of a region that deformed on the reflective surface based on the applied force.

7. The method of claim 1, wherein the characteristic of the applied force includes a frequency of an occurrence of the applied force.

8. The method of claim 1, wherein the characteristic of the applied force includes a magnitude of the applied force.

9. A radar system configured to:
   transmit radar signals to a reflective surface that has a deformation caused by an applied force;
   receive the radar signals reflected from the reflective surface;
   detect, based on the reflected radar signals, the deformation of the reflective surface; and
   measure a characteristic of the applied force based on the detected deformation.

10. The radar system of claim 9, further configured to:
    map the characteristic of the applied force to an input for a computing device; and
    cause the computing device to act based on the input.

11. The radar system of claim 9, wherein the characteristic of the applied force includes a location of the applied force on the reflective surface.

12. The radar system of claim 9, wherein the characteristic of the applied force includes a movement of the applied force across the reflective surface.

13. The radar system of claim 9, wherein the characteristic of the applied force includes a direction of the applied force.

14. The radar system of claim 9, wherein the characteristic of the applied force includes a size of a region that deformed on the reflective surface based on the applied force.

15. The radar system of claim 9, wherein the characteristic of the applied force includes a frequency of an occurrence of the applied force.

16. The radar system of claim 9, wherein the characteristic of the applied force includes a magnitude of the applied force.

17. The radar system of claim 9, wherein the reflective surface comprises a surface of a keyboard, a surface of a display screen, a surface of a television, or an exterior surface of a robot.

18. The radar system of claim 9, wherein the deformation is caused by a push, a pull, a twist, a bend, or a physical vibration of the reflective surface.

19. The method of claim 1, wherein the reflective surface comprises a surface of a keyboard, a surface of a display screen, a surface of a television, or an exterior surface of a robot.

20. The method of claim 1, wherein the deformation is caused by a push, a pull, a twist, a bend, or a physical vibration of the reflective surface.

* * * * *